UNITED STATES PATENT OFFICE.

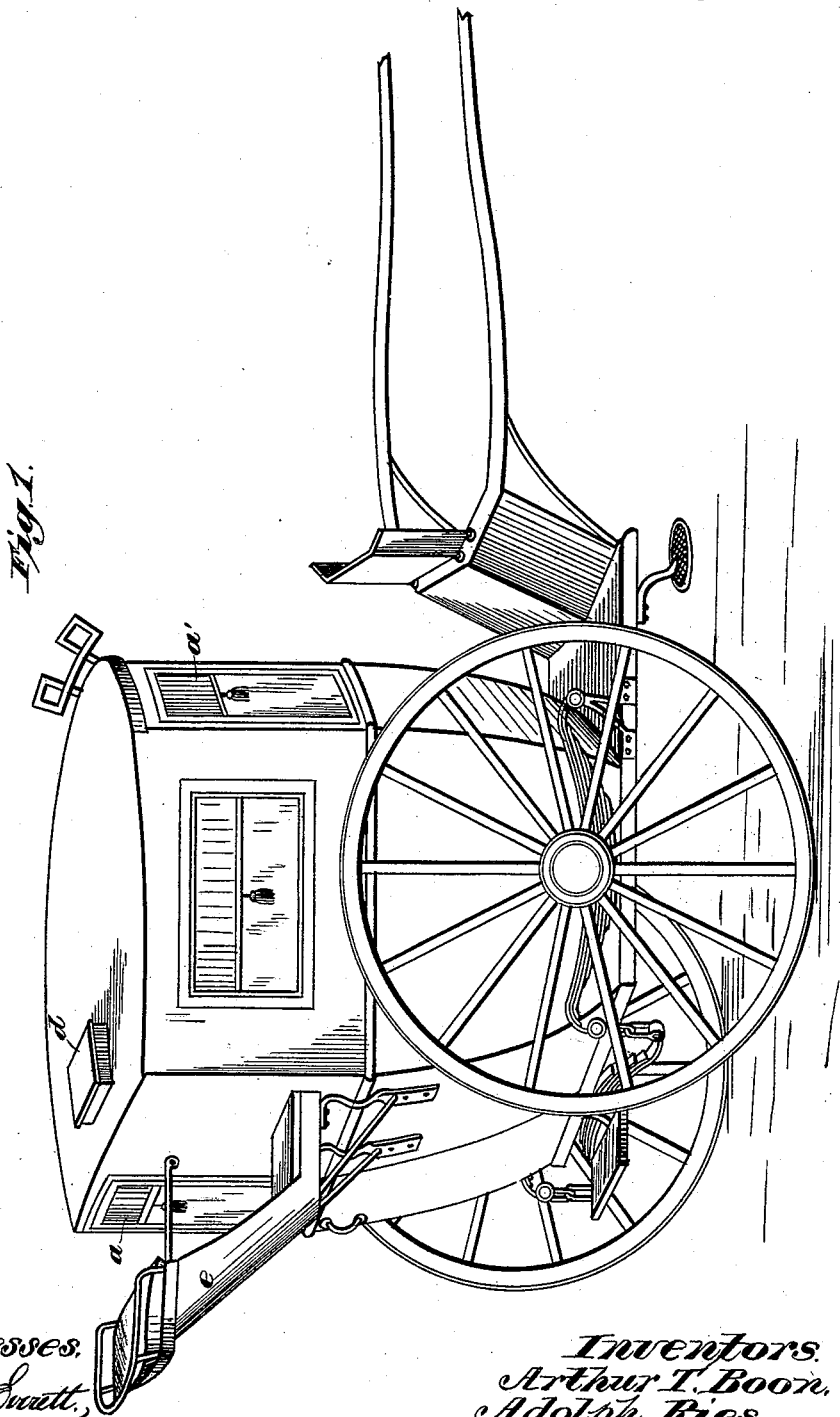

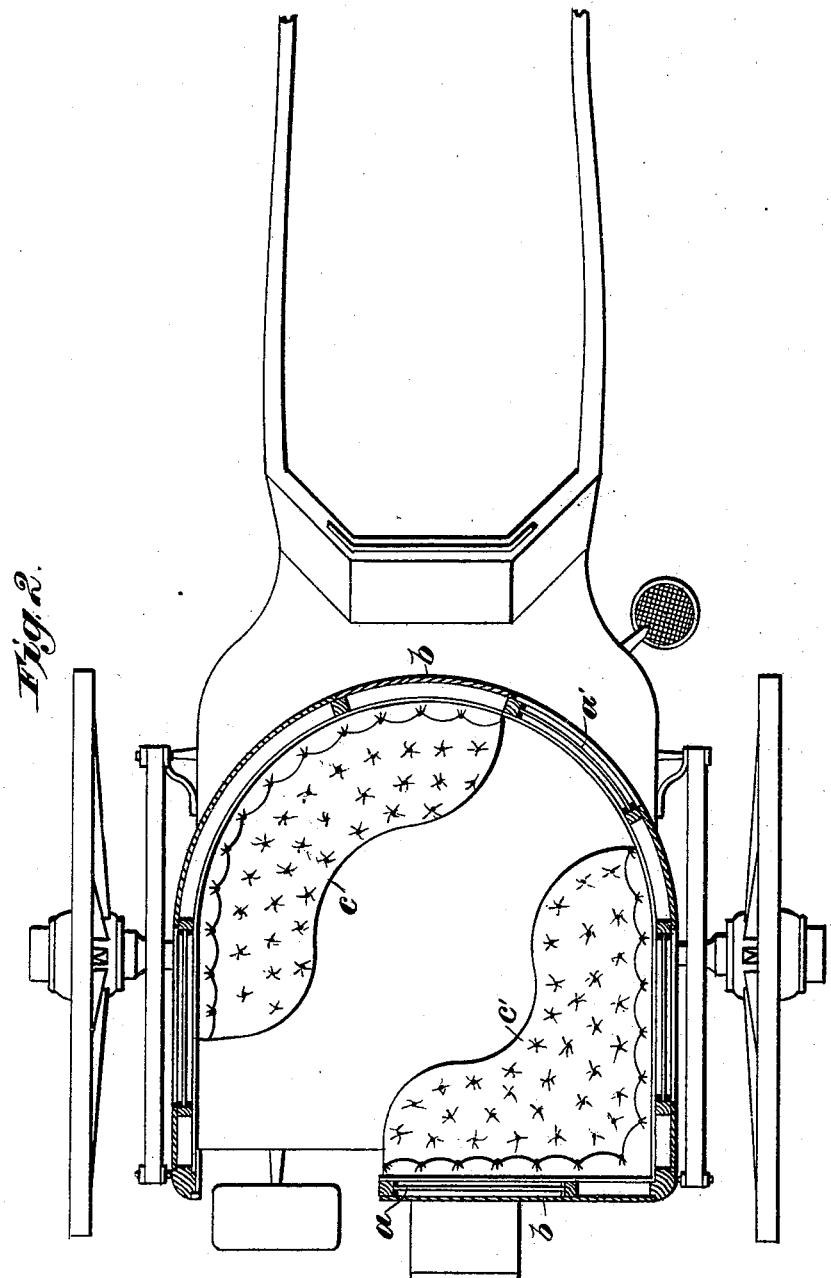

ARTHUR THOMAS BOON, OF CLERKENWELL, AND ADOLPH RIES, OF HATTON GARDEN, COUNTY OF MIDDLESEX, ENGLAND.

TWO-WHEELED CAB.

SPECIFICATION forming part of Letters Patent No. 342,674, dated May 25, 1886.

Application filed April 1, 1886. Serial No. 197,443. (No model.) Patented in England February 10, 1886, No. 1,941.

*To all whom it may concern:*

Be it known that we, ARTHUR THOMAS BOON, a subject of the Queen of Great Britain, residing at 17 Albemarle Street, St. John Street, Clerkenwell, watch-maker, and ADOLPH RIES, a subject of the Queen of Great Britain, residing at 59 Hatton Garden, merchant, both in the county of Middlesex, England, have invented certain new and useful Improvements in the construction of Hansoms or Two-Wheeled Cabs, (for which we have obtained a patent in Great Britain, No. 1,941, dated February 10, 1886,) of which the following is a specification.

Our invention has for its object an improvement in that class of two-wheeled cabs known as the "hansom," such improvement being also applicable to analogous two-wheeled carriages.

We construct our improved cab so that it may hold four persons inside, and can be more easily entered, either at the back or front, than hitherto has been the case.

In carrying out our invention we form the body of our improved cab with a circular front, having an opening for entrance into the cab, at one side near the shafts, and instead of the driver's seat being in the center of the back of the cab, we place it on one side, so as to allow the cab to be entered from another door at the back of the cab. These doors are at opposite angles or positions to one another, and may be closed either by sliding doors, or any other suitable and convenient means.

The seats are arranged round the cab on each side from one door to the other, and will be found capable of seating two persons on each side with comfort.

Our improved cab is much more easy to enter than the ordinary hansom-cab, particularly as it may be entered either from the back or front, and the inconvenience attendant upon cabs of this style in wet or muddy weather is at once obviated; and in order that our invention may be readily understood by persons skilled in the art, reference is hereby made to the accompanying drawings, in which similar letters of reference indicate corresponding parts.

Figure 1 is a perspective view; and Fig. 2 is a plan view, partly in section, showing the arrangement of the seats and doors.

The doors $a$ $a'$ are (by preference) made to slide in the grooves $b$ $b'$ when they are opened; but they may be made to swing upon hinges, if preferred. The door $a$ is at the back of the cab, and on the "near" side, to the left hand of the driver. The door $a'$ is in front, and on the "off" side.

$c$ is the front seat, and $c'$ is the back seat, both of which are capable of accommodating two persons.

$d$ is the opening in the roof for communicating with the driver.

$e$ is the driver's seat, which is fitted on the off side of the door $a$, and as near the middle as the size of the door $a$ will allow.

Having fully described our invention, what we desire to claim and secure by Letters Patent is—

1. In a two-wheeled carriage of the description known as "hansom-cabs," the arrangement and combination of the door $a$ on the left-hand side of the driver and the door $a'$ on the off side of the front, substantially as described, and shown on the drawings.

2. In carriages of the description aforesaid, the arrangement and combination of the seat $c$ at the front and near side and the seat $c'$ at the back and off side of the same, substantially as described, and shown on the drawings.

3. In the construction of carriages of the description aforesaid, the combination of the doors $a$ and $a'$ with the seats $c$ and $c'$, severally arranged substantially as described, and shown on the drawings.

Dated this 15th day of March, 1886.

ARTHUR THOMAS BOON.
ADOLPH RIES.

Witnesses:

GEO. C. DOWNING,
8 *Quality Court, London, W. C.*
W. J. SKERTEN,
28 *Southampton Buildings, London, W. C.*